July 22, 1947.  R. D. WASSERMAN  2,424,522

METHOD OF BONDING ADJACENT ENDS OF METALLIC TUBING

Filed March 8, 1944

INVENTOR.
RENE D. WASSERMAN.
BY Leon M. Strauss

Patented July 22, 1947

2,424,522

UNITED STATES PATENT OFFICE 2,424,522

METHOD OF BONDING ADJACENT ENDS OF METALLIC TUBING

Rene D. Wasserman, New York, N. Y.

Application March 8, 1944, Serial No. 525,501

1 Claim. (Cl. 113—112)

This invention refers to an improved method of welding, soldering or brazing together ferrous and/or non-ferrous tubular elements.

It is one of the main objects of the present invention to provide means which may be continuously or intermittently fed between the butt ends of work pieces, such as tubings, pipes and like tubular elements, to rigidly and closely bond or unite them together upon application of heat, thereby affording saving in time and reducing the cost in the manufacture of structures, frame work, etc.

It is another object of the present invention to speed manufacture and assembly of structural work pieces by provision of means which may be severed from a continuous strip, substantially conformed to the contour of and interposed between the adjoining cross cut ends of said work pieces for bonding purposes.

Still another object of this invention is to provide predetermined method steps to bring about a uniform, efficient and tight weld connection between contiguous work pieces without exercising any preparatory care (such as recessing or shaping of the ends of said work pieces) or any finishing or after treatment (grinding, filling, turning, etc.) upon accomplishment of the welding, brazing or soldering operation.

Still a further object of this invention is to provide relatively thin and flat means for the purpose of joining butt ends of work pieces together without substantially increasing the weight of said work pieces, said thin, flat means possessing approximately the thickness of the seam produced when heating said means for said purpose far below the melting point of the material of the work pieces.

Other objects of the invention will appear as the description proceeds, it being understood, however, that it is not intended that the invention be limited to the exact details described herein; and it is further intended that there be included, as part of the invention, all such obvious changes and modifications thereof as would occur to a person skilled in the art to which this invention pertains and as would fall within the scope of the claim.

Figures 1, 2:
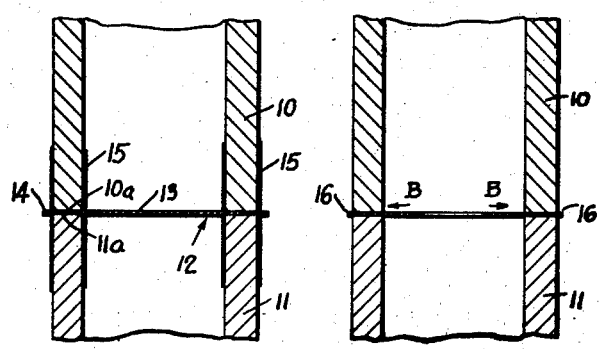
Fig. 1 shows in diagrammatic form a cross-sectional view of contiguous ends of pipe portions preparatory to welding operation.
Fig. 2 is a view similar to that of Fig. 1 during a stage of the welding operation.
Figure 4:
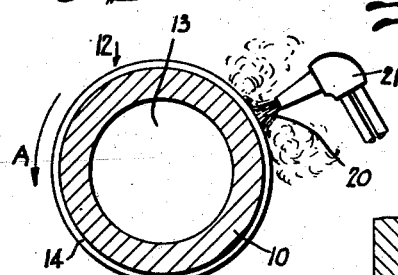
Fig. 4 is a bottom view of Fig. 1 with heating means applied to the contiguous ends of the pipe portions.
Figure 3:
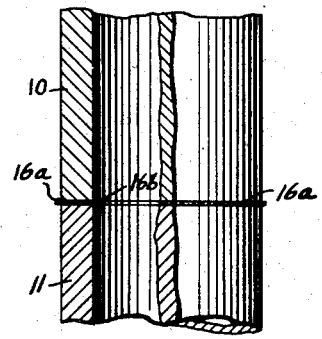
Fig. 3 is an elevational view (partly broken away) of the welded pipe portions after welding operation.

In Figs. 1 to 4, there are indicated some steps according to which pipe portions or sections 10, 11 may be welded or bonded together at their straight butt ends 10a, 11a in a continuous manner as it is desirable for mass production or in single operation.

According to this invention alloy or metal for welding, brazing or soldering purposes may be fed from a roll of band or strip continuously or intermittently between the contiguous cross cut ends of pipe sections 10, 11 or any other like tubular shaped work pieces. Band 12 may be introduced between said ends and may then be cut to fit approximately the particular outer boundary or perimeter of the pipe ends or the band 12 may be punched or stamped before its introduction between said pipe ends. Such process steps may be well realized and carried out on any appropriate machine. The thickness and composition of the band alloy material may be chosen according to the thickness of the walls of the ends of the pipes or work pieces and may vary in accordance with the character, color and quality of the metal of the work pieces.

As one of many possible examples reference is herewith made to pipe sections 10, 11 of steel or galvanized steel which are about ⅜ of an inch thick and which are to be joined together end to end. The alloy in form of a strip 12 may, for instance, consist substantially of copper, nickel, zinc with the addition of silver as described in U. S. Letters Patent No. 2,279,284, dated April 7, 1942, and may have a thickness varying from .003 of an inch up to .020 or .040 of an inch. Such strip is interposed between said pipe ends and may project therebeyond with a small margin or rim 14 as clearly seen in Figs. 1 and 4. In some instances, such rim may be entirely dispensed with.

It is preferred to first clean the ends 10a, 11a of pipe sections 10, 11 by filing or grinding, to cover such ends on the inner and outer walls thereof by a film of suitable flux 15 and to then introduce band piece 12 therebetween. The alloy band piece is solid and cut along edge 14 to conform to the boundary of the pipe ends. After preheating of the pipe ends and upon subsequently applying according to arrow A the flame 20 of torch 21 uniformly to and along the outer wall of pipe sections 10, 11 and projecting alloy rim 14, it was observed that the extremely thin solid band piece 12 was being melted and shortened to rim 16 and became also fluid at its middle portion 13, from where it was creeping in the direction of the inner walls of the pipe ends according to arrows B—B and was presumably attracted by capillary action into the air gap between said ends 10a, 11a to form a perfect bond at the inner and outer wall ends of pipe sections 10, 11 at locations 16a, 16b.

The alloys for welding, soldering, and brazing are manufactured in strips and continuous bands, the thickness of which being approximately equal to the thickness of the seams to be produced during the bonding operation, which may be performed preferably on copper, tin- or zinc-coated tubular elements of steel or metal pieces of brass, aluminum, nickel, etc.

It is obvious that the metal pieces to be joined or bonded together have straight abutting ends or edges which may be alignedly held in position by any known device. It is further to be noted that instead of a single welding torch, several torches may be applied to uniformly heat the interposed alloy strip while said welding torches are revolving, for instance, about contiguous, tubular ends.

Many modifications of and various embodiments and applications of the invention are possible and may be evident to those skilled in the art without departing from the spirit and scope of this invention. The disclosure and description relating to this application are purely illustrative and in no way limitative.

Having thus described the invention, what is claimed as new and desired to be secured by Letters Patent is:

A process for bonding together adjacent butt ends of metallic tubings, pipes and like tubular elements, which comprises interposing between said butt ends a flexible, solid sheet of alloy material having a melting point below that of the elements to be bonded and a thickness between 0.003 and 0.04 inch, thus obstructing the inner diameter of said elements, and applying heat to those portions of the outer wall parts of said elements adjoining their butt ends and the interposed sheet of alloy material until said alloy material becomes fluid, thereby causing the enclosed central portion of said sheet to creep toward the inner wall parts of said elements and between said butt ends, whereby a bonding seam is formed between said butt ends with the inner diameter of said elements substantially free from said central sheet portion.

RENE D. WASSERMAN.

REFERENCES CITED

The following references are of record in the file of this patent:

UNITED STATES PATENTS

| Number | Name | Date |
|---|---|---|
| 684,670 | Boehmler | Oct. 15, 1901 |
| 1,823,028 | Caldwell | Sept. 15, 1931 |
| 2,152,812 | Money | Apr. 4, 1939 |
| 2,297,554 | Hardy | Sept. 29, 1942 |
| 2,033,122 | Cornell | Mar. 10, 1936 |